C. CUNO.
BINDING POST.
APPLICATION FILED NOV. 11, 1907.
903,130.
Patented Nov. 3, 1908.
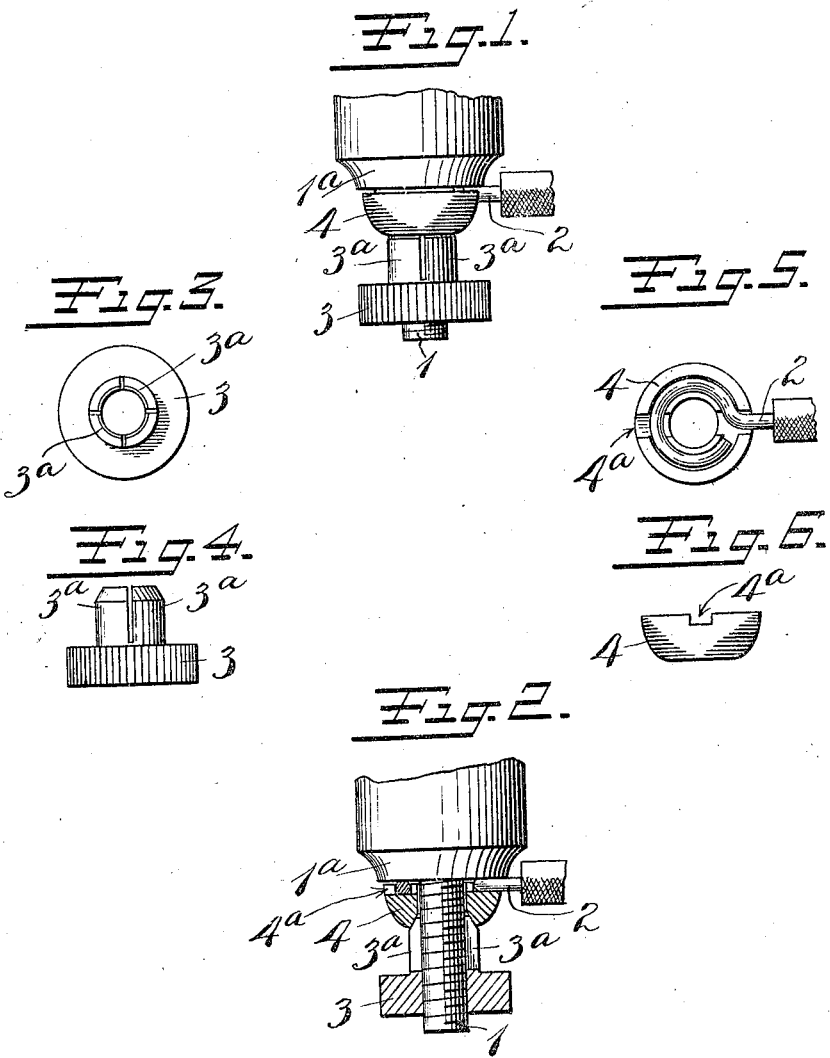
Witnesses:
Inventor
CHARLES CUNO
By his Attorneys

UNITED STATES PATENT OFFICE.

CHARLES CUNO, OF MERIDEN, CONNECTICUT, ASSIGNOR TO CONNECTICUT AUTO ENGINEERING CORPORATION, OF MERIDEN, CONNECTICUT, A CORPORATION OF CONNECTICUT.

BINDING-POST.

No. 903,130.　　　　Specification of Letters Patent.　　　　Patented Nov. 3, 1908.

Original application filed September 19, 1906, Serial No. 335,176. Divided and this application filed November 11, 1907. Serial No. 401,571.

*To all whom it may concern:*

Be it known that I, CHARLES CUNO, a citizen of the United States, residing at Meriden, county of New Haven, State of Connecticut, have invented certain new and useful Improvements in Binding-Posts, of which the following is a full, clear, and exact description.

My invention relates to improvements in attaching devices, for example, electrical terminal connections or binding posts.

This application is a division from my former application Serial No. 335,176, filed September 19, 1906.

The object of the invention is to provide simple and effective means for permitting two parts to be quickly and securely connected, for example, a wire to be quickly secured to a terminal, the securing means being such that when the parts are set up, dislodgment and the danger of accidental disengagement of the wire is prevented.

In the drawings Figure 1 is a side elevation of my invention as in operation and in the form of a binding post; Fig. 2 is a side elevation of the same partly in section; Fig. 3 is an end view of a detail; Fig. 4 is a side elevation thereof; Fig. 5 is a view of one of another detail showing the end of a wire; Fig. 6 is an edge view of the detail shown in Fig. 5, looking from left to right, the wire being removed.

1 represents a screw-threaded body or support mounted on a suitable base 1ª, which forms an abutment or shoulder.

2 represents a wire to be connected to the body 1.

3 is a nut screw-threaded on the body 1.

3ª 3ª are forwardly projecting clutch jaws, the ends of which are tapered, as indicated in Figs. 2, 3 and 4.

4 is a washer slidable on the body 1. This washer has a beveled entrance at one side arranged to receive the beveled ends of the jaws 3ª 3ª (see Fig. 2). At the opposite side this washer is preferably provided with a curved or annular groove (as best seen in Fig. 5), in which the curved portion or bent end of wire 2 may lie.

4ª is a lateral recess in the outer wall of washer 4 intersecting the said groove, and provided to afford clearance for the wire. One or more of these recesses 4ª may be provided, but two are preferable where the wire 2 is to enter the washer from one side and project from the other. In this sense the device may be used as a cleat, and when so used may be insulated or made of insulated material.

The annular groove in the washer 4 forms a secure seat for the curved wire, which, because of this curve or crimp, is most effectively held from slipping. When a connection is to be made it requires no more than finger power to securely bind the parts together and prevent accidental displacement. In operation the jaws 3ª 3ª first move the washer 4 to a position where the resistance of the abutment is encountered. When the washer can move no farther, the jaws 3ª 3ª contract by engaging with the incline and frictionally clutch the part 1. A secure connection is thus made without jamming or weakening the wire or any of the parts.

What I claim is—

1. In a device of the character described, a threaded body, a nut screw-threaded thereon, a washer having a curved groove on one side intersected by a lateral recess at the outer edge of the washer, an abutment facing said groove, said nut coöperating with said washer to move the same toward said abutment, and clutch jaws between the washer and nut arranged to coöperate therewith.

2. In a device of the character described, a threaded body, a nut screw-threaded thereon, a washer having a curved groove on one side intersected by a lateral recess at the outer edge thereof, an abutment facing said groove, said nut coöperating with said washer to move the same toward said abutment, clutch jaws on the nut engaging said washer, and an incline on the latter to force said jaws into binding engagement on said threaded body.

3. In a device of the character described, a threaded body, a nut screw-threaded thereon, a washer having a curved groove on one side intersected by a lateral recess at the outer edge thereof, an abutment facing said groove, said nut coöperating with said washer to move the same toward said abutment, clutch jaws carried by said nut and having tapered ends, a tapered entrance at the side of the washer facing said jaws and arranged to receive the same and force them into binding engagement with said support.

4. In a binding post including a threaded terminal having an abutment thereon, a washer movable on said terminal, a tapered entrance at one side of said washer, a nut jaws movable therewith and arranged to coöperate with the tapered entrance of said washer and contract as the nut is moved toward said washer.

5. In a binding post, a threaded terminal having an abutment thereon, a washer movable on said terminal and having a tapered central seat in its face opposite said abutment, and a lock nut having a split tapered shank adapted to the tapered central seat in said washer.

6. In a device of the character described, a threaded body, an abutment thereon, a washer movable on said body, a screw-threaded nut movable on said body, clutch jaws carried by one of said movable parts, a tapered seat on the other part arranged to receive said jaws and press them into binding engagement with said body.

CHAS. CUNO.

Witnesses:
LANGDON MOORE,
CHAS. A. PEARD.